No. 729,639. PATENTED JUNE 2, 1903.
J. F. McCOY.
BASE BALL BAT.
APPLICATION FILED JULY 8, 1902.
NO MODEL.
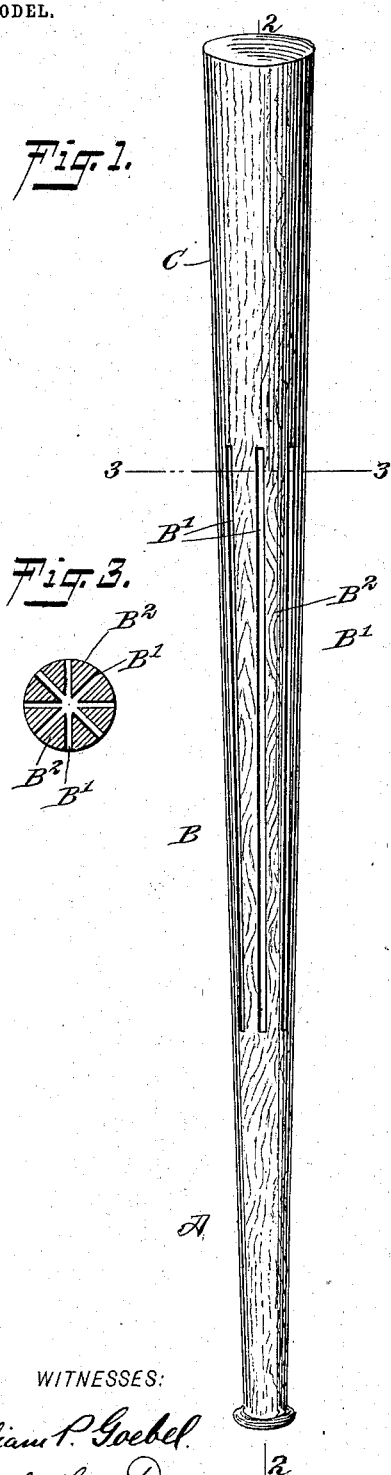
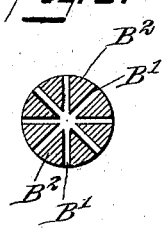
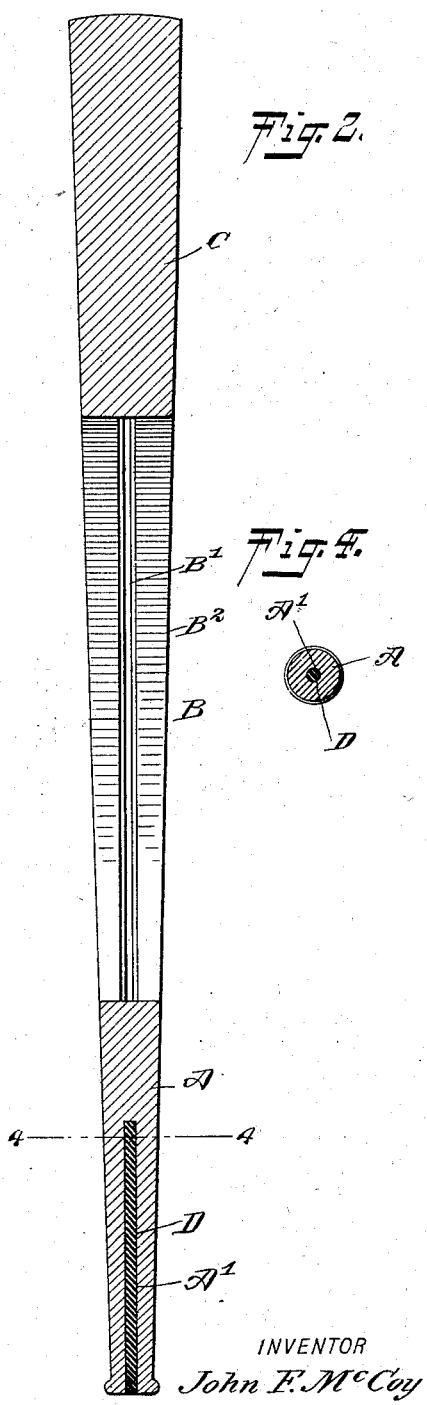
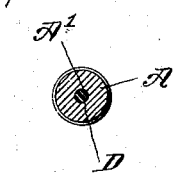
WITNESSES:
William P. Goebel
Reo. G. Hosh
INVENTOR
John F. McCoy
BY
ATTORNEYS.

No. 729,639. Patented June 2, 1903.

UNITED STATES PATENT OFFICE.

JOHN FRANCIS McCOY, OF NEW ORLEANS, LOUISIANA.

BASE-BALL BAT.

SPECIFICATION forming part of Letters Patent No. 729,639, dated June 2, 1903.

Application filed July 8, 1902. Serial No. 114,729. (No model.)

*To all whom it may concern:*

Be it known that I, JOHN FRANCIS MCCOY, a citizen of the United States, and a resident of New Orleans, in the parish of Orleans and State of Louisiana, have invented a new and Improved Base-Ball Bat, of which the following is a full, clear, and exact description.

The invention relates to games; and its object is to provide a new and improved base-ball bat not liable to break when in use and arranged to readily flex or spring between the handle and butt to allow driving the base-ball with great force and speed and to a greater distance than was heretofore possible by using the ordinary solid bats.

The invention consists of novel features and parts and combinations of the same, as will be more fully described hereinafter and then pointed out in the claim.

A practical embodiment of the invention is represented in the accompanying drawings, forming a part of this specification, in which similar characters of reference indicate corresponding parts in all the views.

Figure 1 is a perspective view of the improvement. Fig. 2 is a longitudinal sectional elevation of the same on the line 2 2 of Fig. 1. Fig. 3 is a cross-section of the same on the line 3 3 of Fig. 1, and Fig. 4 is a similar view of the same on the line 4 4 of Fig. 2.

The base-ball bat, made of hickory or other suitable hard wood, consists, essentially, of a handle A, a shank B, and a butt C, of which the shank B is formed with a number of longitudinally-extending slots B', arranged diametrically to form bars B², approximately triangular in cross-section and integrally connected at their ends with the solid material of the handle A and butt C. By the arrangement described the bars B² render the shank flexible, so that when the bat is in use the ball can be driven with great force and speed and a greater distance than was heretofore possible by the ordinary solid bats, it being understood that the butt C on striking the ball yields and rebounds, owing to the flexible shank, and consequently sends the ball a greater distance.

By making the shank flexible it is not liable to break as easily as the solid shank of ordinary bats now in use.

The handle A is formed with a central opening A' for containing a filling D, of rubber, cork, or similar flexible material or substance, the said filling extending from the outer end of the handle to within a short distance of the inner end thereof, as plainly indicated in Fig. 2. The filling serves to protect the hands having hold of the handle A from shock as the ball is struck by the bat.

Having thus described my invention, I claim as new and desire to secure by Letters Patent—

A base-ball bat, comprising a handle, a shank and a butt; the shank having a series of longitudinally-extending diametrical slots, whereby to form said shank into spaced bars, and thereby render said shank-section springy in all directions; said bars being integral at their ends with the handle and butt; said butt being formed of solid material; and said handle having a central longitudinal bore; and a filling of flexible material in said bore, as specified and for the purpose set forth.

In testimony whereof I have signed my name to this specification in the presence of two subscribing witnesses.

JOHN FRANCIS McCOY.

Witnesses:
THOS. N. GILMORE,
GASTON BOUNAFORD.